(12) United States Patent
Tang et al.

(10) Patent No.: US 10,908,752 B1
(45) Date of Patent: Feb. 2, 2021

(54) DISPLAY PANEL WITH TOUCH SENSOR

(71) Applicant: NOVATEK Microelectronics Corp., Hsin-Chu (TW)

(72) Inventors: Yu-Ying Tang, Taoyuan (TW); Chih-Chang Lai, Taichung (TW); Ching-Yang Pai, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 15/930,408

(22) Filed: May 12, 2020

Related U.S. Application Data

(60) Provisional application No. 62/976,356, filed on Feb. 14, 2020.

(51) Int. Cl.
*G06F 3/041* (2006.01)
*G06F 3/044* (2006.01)

(52) U.S. Cl.
CPC .......... *G06F 3/0445* (2019.05); *G06F 3/0412* (2013.01); *G06F 3/0416* (2013.01)

(58) Field of Classification Search
CPC ..... G06F 3/0412; G06F 3/0416; G06F 3/0445
See application file for complete search history.

(56) References Cited

U.S. PATENT DOCUMENTS

| 9,841,853 | B2 * | 12/2017 | Pai | G06F 3/04166 |
|---|---|---|---|---|
| 9,996,187 | B2 * | 6/2018 | Lai | G06F 3/041661 |
| 10,055,049 | B2 * | 8/2018 | Lai | G06F 3/04166 |
| 10,599,239 | B2 * | 3/2020 | Kim | H01L 27/124 |
| 10,678,369 | B2 * | 6/2020 | Lai | G06F 3/0443 |
| 2008/0100590 | A1 * | 5/2008 | Hur | G06F 3/047 |
|  |  |  |  | 345/173 |
| 2014/0368750 | A1 * | 12/2014 | Liao | G06F 3/0443 |
|  |  |  |  | 349/12 |
| 2016/0202813 | A1 * | 7/2016 | Lee | G06F 3/04184 |
|  |  |  |  | 345/174 |
| 2017/0060328 | A1 * | 3/2017 | Kim | G02F 1/13338 |
| 2017/0160844 | A1 * | 6/2017 | Li | G06F 3/04166 |
| 2017/0192568 | A1 * | 7/2017 | Kim | G06F 3/0412 |
| 2018/0035923 | A1 * | 2/2018 | Kang | A61B 5/117 |
| 2018/0046298 | A1 * | 2/2018 | Weng | G06F 3/0412 |
| 2019/0204972 | A1 * | 7/2019 | Shin | G06F 3/0443 |

* cited by examiner

*Primary Examiner* — Joe H Cheng
(74) *Attorney, Agent, or Firm* — Winston Hsu (57) ABSTRACT

A display panel includes a common electrode layer and a touch sensor. The common electrode layer has a conductive material. The touch sensor, disposed over the common electrode layer, includes a plurality of touch sensing electrodes and a plurality of conductive lines. Each of the plurality of conductive lines is coupled to at least one of the plurality of touch sensing electrodes. Wherein, the conductive material in an area of the common electrode layer overlapping a part of the plurality of conductive lines is removed.

10 Claims, 8 Drawing Sheets

DISPLAY PANEL WITH TOUCH SENSOR

CROSS REFERENCE TO RELATED APPLICATIONS

This application claims the benefit of U.S. Provisional Application No. 62/976,356, filed on Feb. 14, 2020, the contents of which are incorporated herein by reference.

BACKGROUND OF THE INVENTION

1. Field of the Invention

The present invention relates to a display panel, and more particularly, to a display panel integrated with a touch sensor.

2. Description of the Prior Art

In recent years, touch sensing technology advances rapidly, and many consumer electronic products such as mobile phones, GPS navigator systems, tablets, personal digital assistants (PDA) and laptops are equipped with touch sensing functions. In various electronic products, touch sensing functions are included in a display area which originally had only display functions. In other words, an original display panel is replaced by a touch panel having both display and touch sensing functions. The touch panel can generally be divided into out-cell, in-cell and on-cell touch panel according to the difference in structure of the touch panel. The out-cell touch panel is composed of an independent touch panel and a general display panel. In the in-cell and on-cell touch panel, a touch sensing device is directly disposed on inside and outside of a substrate in the display panel, respectively.

Due to the trends of light, thin, and flexibility of the touch panel, the distance of the touch sensor layer and the display panel becomes quite small. For example, the thickness of the encapsulation layer of an OLED panel may reach 10 μm or less, and/or the glass substrate of a novel on-cell or in-cell LCD panel may be implemented with a glass thinning process. In such a newly developed touch panel, the parasitic capacitance between the display electrodes and the touch sensor may be far greater than the parasitic capacitance of the conventional touch panel. This is because the parasitic capacitance value is inversely proportional to the distance between the touch layer and the display electrodes. The increasing parasitic capacitance results in higher RC loading. In such a situation, the driver should provide higher driving capability to drive the display pixels, causing higher circuit costs such as larger power consumption and circuit areas required in the driver.

Thus, there is a need to provide a novel display panel in which the problem of excessively large RC loading may be improved.

SUMMARY OF THE INVENTION

It is therefore an objective of the present invention to provide a display panel, in order to solve the abovementioned problems.

An embodiment of the present invention discloses a display panel, which comprises a common electrode layer and a touch sensor. The common electrode layer has a conductive material. The touch sensor, disposed over the common electrode layer, comprises a plurality of touch sensing electrodes and a plurality of conductive lines. Each of the plurality of conductive lines is coupled to at least one of the plurality of touch sensing electrodes. Wherein, the conductive material in an area of the common electrode layer overlapping a part of the plurality of conductive lines is removed.

Another embodiment of the present invention discloses a display panel, which comprises a common electrode layer and a touch sensor. The touch sensor, disposed over the common electrode layer, comprises a plurality of touch sensing electrodes and a plurality of conductive lines. The plurality of touch sensing electrodes are composed of a conductive material. Each of the plurality of conductive lines is coupled to at least one of the plurality of touch sensing electrodes. Wherein, the conductive material in an area of the plurality of touch sensing electrodes overlapping a part of the plurality of conductive lines is removed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
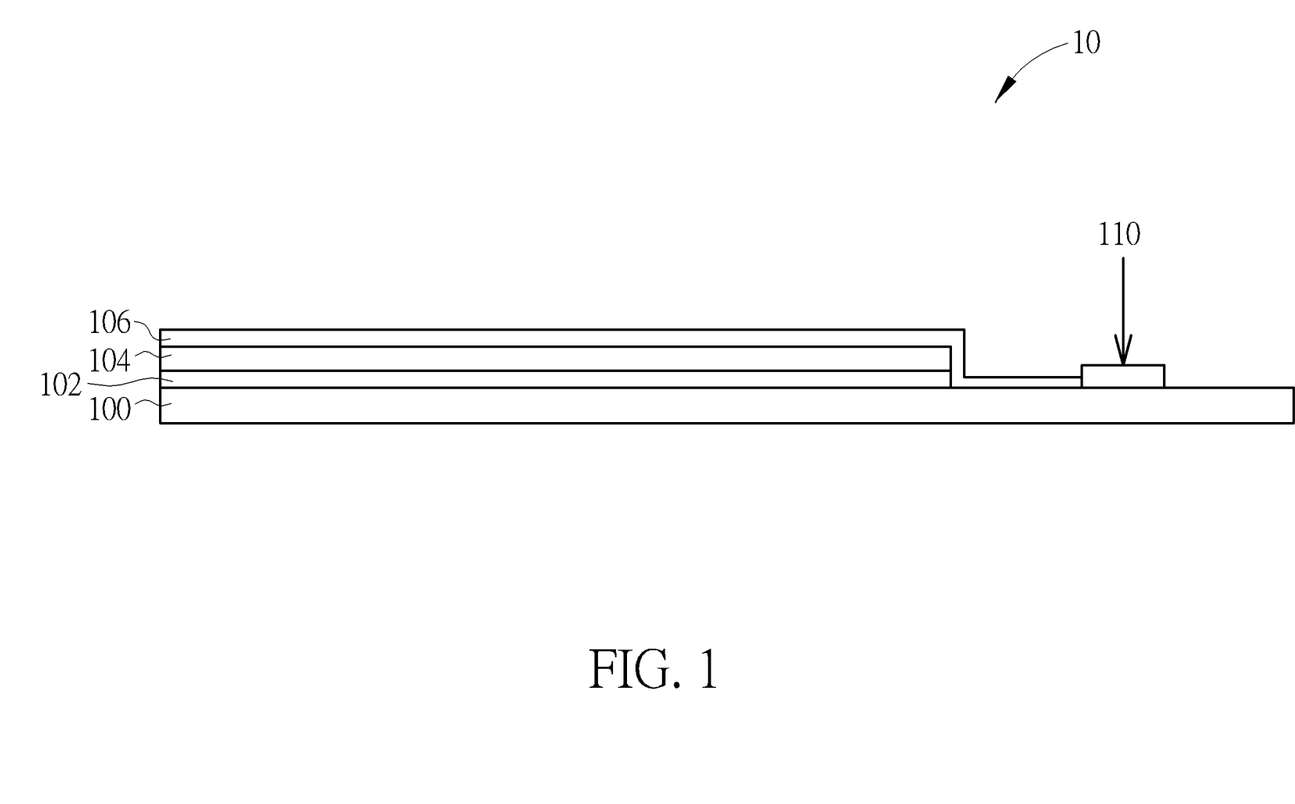
FIG. 1 is a schematic diagram of an organic light-emitting diode (OLED) panel.

Please refer to FIG. 1, which is a schematic diagram of an organic light-emitting diode (OLED) panel 10. As shown in FIG. 1, the OLED panel 10, which may be a touch panel capable of touch sensing functions, is briefly composed of a substrate 100, a common electrode layer 102, an encapsulation layer 104 and a touch sensor layer 106. The substrate 100 may be a glass substrate in general. If the OLED panel 10 is a flexible, bendable or foldable panel, the substrate 100 may be composed of a flexible material such as a polyimide film. The common electrode layer 102 may be composed of a conductive material such as metal. In the OLED panel 10, the common electrode layer 102 may include the cathode electrode or anode electrode of the OLED in each display pixel. The OLEDs and other related circuitry are included in the encapsulation layer 104. In the encapsulation layer 104, a thin film encapsulation (TFE) technology may be applied, where organic material, silicon oxide, and/or any other nonconductive materials may be used to encapsulate the circuit lines and OLED elements. The encapsulation layer 104 aims at isolating the circuit lines and elements to prevent them from being oxidized. The touch sensor layer 106 may include a plurality of touch sensing electrodes and a plurality of conductive lines, where each conductive line may be connected to at least one of the touch sensing electrodes, for forwarding touch driving signals and/or sensing signals. A driving circuit 110, which may be included in the OLED panel 10 or independent to the OLED panel 10, is coupled to the common electrode layer 102, the encapsulation layer 104 and the touch sensor layer 106, for controlling the display and touch operations of the OLED panel 10. In an embodiment, the driving circuit 110 may be implemented as an integrated circuit (IC) included in a chip.

Figure 2:
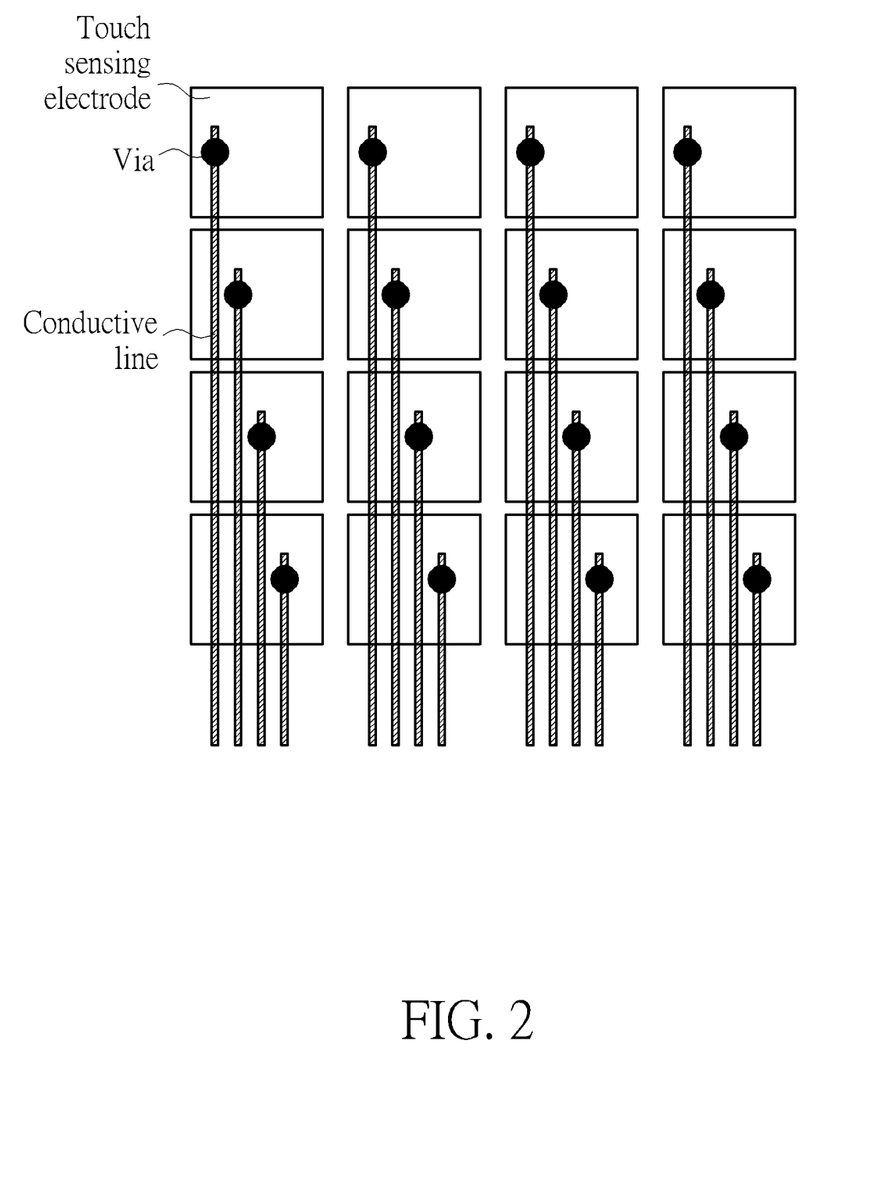
FIG. 2 is a schematic diagram of a detailed implementation of the touch sensor layer.

FIG. 2 illustrates a detailed implementation of the touch sensor layer 106 from top view. In detail, the touch sensor layer 106 may include two layers, where the touch sensing electrodes may be disposed in one layer and the conductive lines may be disposed in another layer. Each touch sensing electrode may be a conductive block implemented as a mesh or a pad. In order to prevent the touch sensor elements from influencing the display image, the touch sensing electrodes and the conductive lines may be composed of a transparent material such as indium tin oxide (ITO). As shown in FIG. 2, the touch sensor may be a self-capacitance touch sensor, where each conductive line is connected to one touch sensing electrode through a via. Alternatively, each touch sensing electrode may be connected to a driving line and a sensing line, as the implementation of a mutual-capacitance touch sensor, where a driving line or sensing line may be connected to one or more touch sensing electrodes. Note that FIG. 2 is a top view diagram and the conductive lines are disposed above the touch sensing electrodes. In another embodiment, several or all of the conductive lines may be disposed below the touch sensing electrodes.

In the OLED panel 10, a current may flow through each OLED to generate a desired brightness in each display pixel. In detail, the common electrode layer 102 may include the cathode electrode of the OLED in each pixel or may be connected to the cathode electrode of the OLED in each pixel. A voltage signal corresponding to the display data may be applied to the pixel, in order to generate a corresponding current flowing through the OLED and allow the OLED to emit light based on the current magnitude. The common electrode layer 102 may include a large area flat-plane electrode composed of a conductive material such as metal, which is capable of forwarding the currents of the OLEDs.

As mentioned above, the encapsulation layer 104 of the OLED panel 10 may be quite thin, such that the common electrode layer 102 may be close to the touch sensor layer 106, causing large parasitic capacitance and RC loading between the common electrode layer 102 and the touch sensor layer 106, especially between the common electrode layer 102 and the conductive lines of the touch sensor layer 106 since a conductive line may be a long line passing through an entire panel. The large RC loading may generate a burden on both touch driving and display driving, such that the driving circuit 110 has to provide higher driving capability which may be accompanied by higher circuit costs, otherwise the touch and display performance may be reduced.

Figure 3:
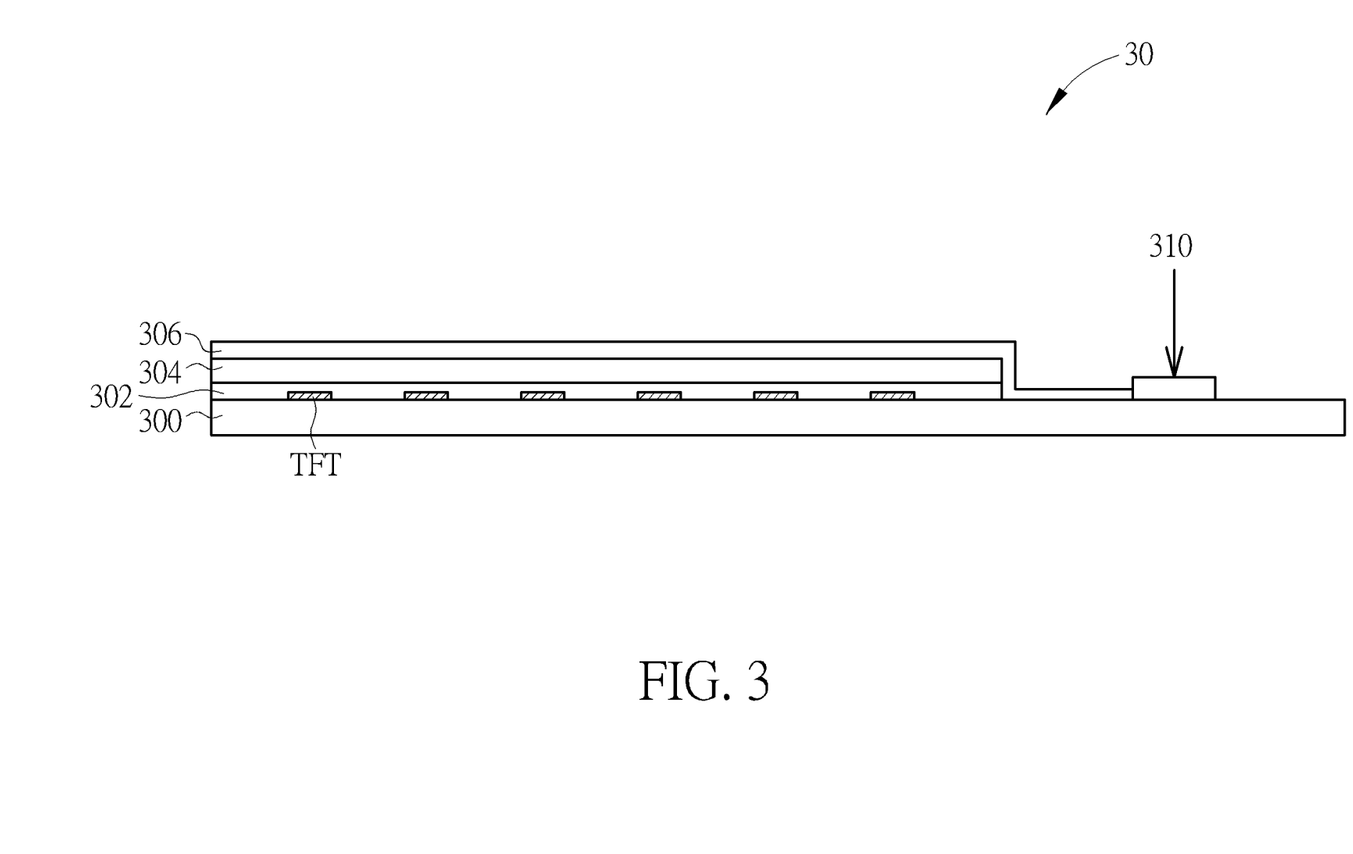
FIG. 3 is a schematic diagram of a liquid crystal display (LCD) panel.

Please refer to FIG. 3, which is a schematic diagram of a liquid crystal display (LCD) panel 30. As shown in FIG. 3, the LCD panel 30, which may be a touch panel capable of touch sensing functions, is briefly composed of a substrate 300, a common electrode layer 302, a color filter layer 304 and a touch sensor layer 306. In general, the substrate 300 may be a glass substrate, on which a thin-film transistor (TFT) layer including TFTs and related circuitry may be disposed. The common electrode layer 302 may include a common voltage electrode of each display pixel in the LCD panel 30, and the common voltage electrode is configured to send a common voltage VCOM to each display pixel. The color filter layer 304 may include black matrix and color resist, which are disposed in a specific manner to let each subpixel of the LCD panel 30 to show a desired color. The touch sensor layer 306 may include a plurality of touch sensing electrodes and a plurality of conductive lines, where the detailed implementations are similar to the touch sensor layer 106 shown in FIGS. 1 and 2 and thus omitted herein. A driving circuit 310, which may be included in the LCD panel 30 or independent to the LCD panel 30, is coupled to the TFT layer, the common electrode layer 302 and the touch sensor layer 306, for controlling the display and touch operations of the LCD panel 30. In an embodiment, the driving circuit 310 may be implemented as an IC included in a chip.

In the LCD panel 30, the common electrode layer 302 may forward the common voltage VCOM to a terminal of the liquid crystal capacitor in each display pixel or subpixel. A voltage signal corresponding to the display data may be applied to another terminal of the liquid crystal capacitor, in order to determine the electric field across the capacitor, which thereby controls the liquid crystal molecules to twist to control the light transmission rate, so as to generate a desired brightness. The common electrode layer 302 may include a large area flat-plane electrode composed of a conductive material such as ITO, which is capable of forwarding the common voltage VCOM.

As mentioned above, in an on-cell or in-cell LCD panel, the common electrode layer 302 may be close to the touch sensor layer 306, causing large parasitic capacitance and RC loading between the common electrode layer 302 and the touch sensor layer 306, especially between the common electrode layer 302 and the conductive lines of the touch sensor layer 306 since a conductive line may be a long line passing through an entire panel. The large RC loading may generate a burden on both touch driving and display driving, such that the driving circuit 310 has to provide higher driving capability which may be accompanied by higher circuit costs, otherwise the touch and display performance may be reduced.

In an embodiment, the conductive material in the common electrode layer may be modified, in order to reduce the parasitic capacitance. In detail, the conductive material in an area of the common electrode layer overlapping the conductive lines of the touch sensor may be removed. In such a situation, the area of the conductive material overlapping the conductive lines may be reduced, in order to reduce the parasitic capacitance therebetween.

Figure 4:
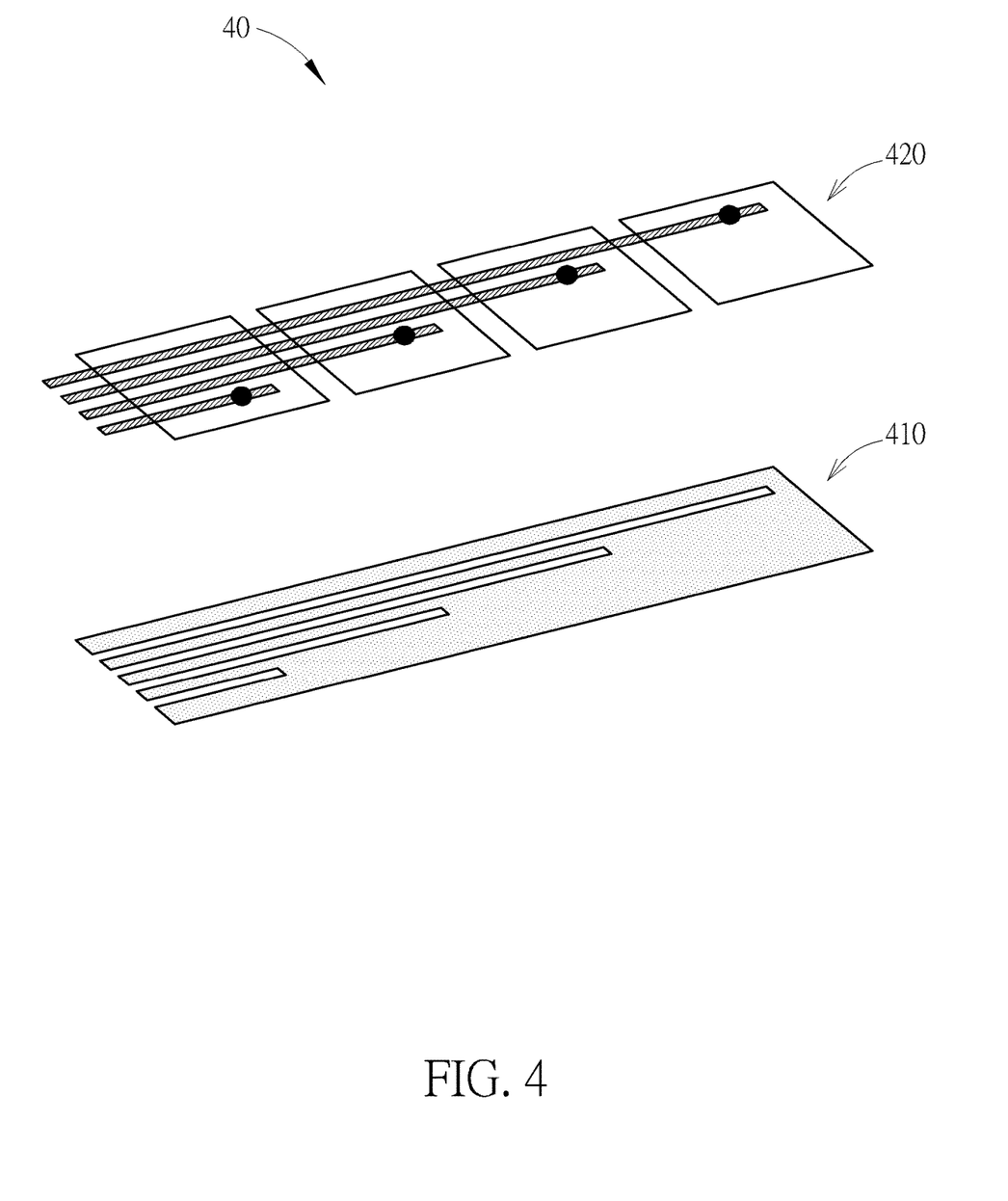
FIG. 4 is a schematic diagram of a display panel according to an embodiment of the present invention.

Please refer to FIG. 4, which is a schematic diagram of a display panel 40 according to an embodiment of the present invention. As shown in FIG. 4, the display panel 40 includes a common electrode layer 410 and a touch sensor layer 420. The common electrode layer 410 may be the common electrode layer 102 included in the OLED panel 10 or the common electrode layer 302 included in the LCD panel 30. The touch sensor layer 420 may be the touch sensor layer 106 included in the OLED panel 10 or the touch sensor layer 306 included in the LCD panel 30. The common electrode layer 410 is composed of a conductive material. The touch sensor layer 420 includes a layer having touch sensing electrodes and a layer having conductive lines. Other possible layers or elements, such as the substrate, encapsulation layer, TFT layer, and color filter, may be included or not based on the panel's type. These elements are omitted herein for brevity without influencing the illustrations of the present embodiment.

As shown in FIG. 4, in the conductive material of the common electrode layer 410, the areas overlapping the conductive lines of the touch sensor layer 420 may be removed. Note that the parasitic capacitance may be mainly generated from the conductive material closest to the conductive lines; i.e., the area of conductive material overlapping the conductive lines. Therefore, removal of the overlapping parts may significantly reduce the parasitic capacitance. These overlapping areas only occupy a small ratio of the entire flat-plane electrode, and thus removal of these areas will not influence the display performance evidently.

Figure 5:
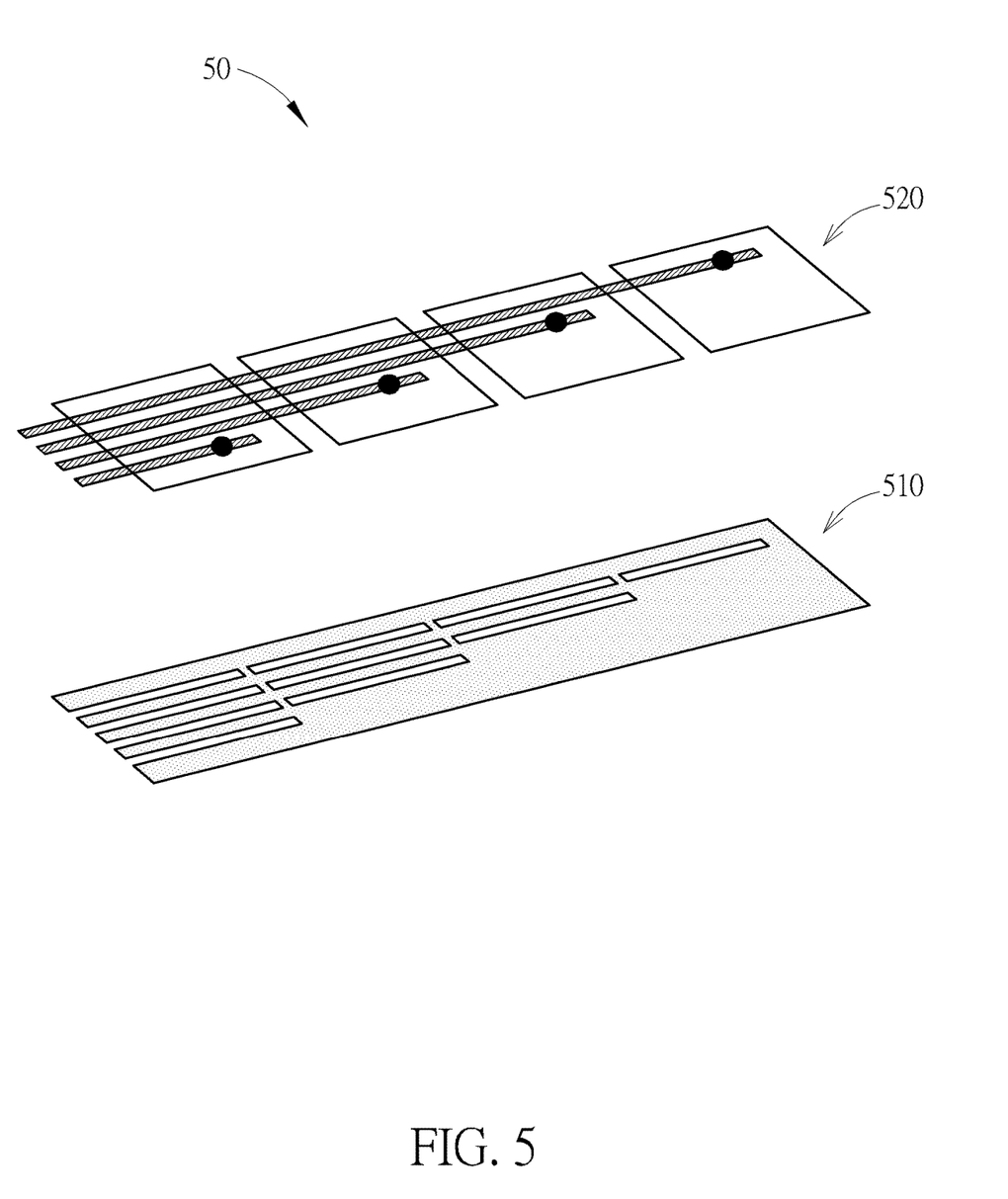
FIG. 5 is a schematic diagram of a display panel in which removal of the conductive material has another pattern.

Please note that the removed part may have any possible patterns. For example, the conductive material in all of the areas of the common electrode layer overlapping the conductive lines may be removed; that is, the removed parts of the conductive material overlap all of the conductive lines. The removed conductive material may generate a plurality of long and narrow gaps corresponding to the conductive lines. In another embodiment, the conductive material in parts of the areas of the common electrode layer overlapping the conductive lines may be removed; that is, the removed parts of the conductive material overlap parts of the conductive lines. An exemplary deployment is shown in FIG. 5, where a display panel 50 having a common electrode layer 510 and a touch sensor layer 520 is illustrated. The difference between the common electrode layer 510 and the common electrode layer 410 is that, in the common electrode layer 510, each gap is segmented by one or more conductive lines to form multiple smaller gaps. These conductive lines may improve the integrity of the conducting capability of the common electrode layer 510 without increasing much parasitic capacitance. Also, connections between the conductive materials in two sides of the gap may reduce the number of required input nodes for the common electrode layer 510.

Figure 6:
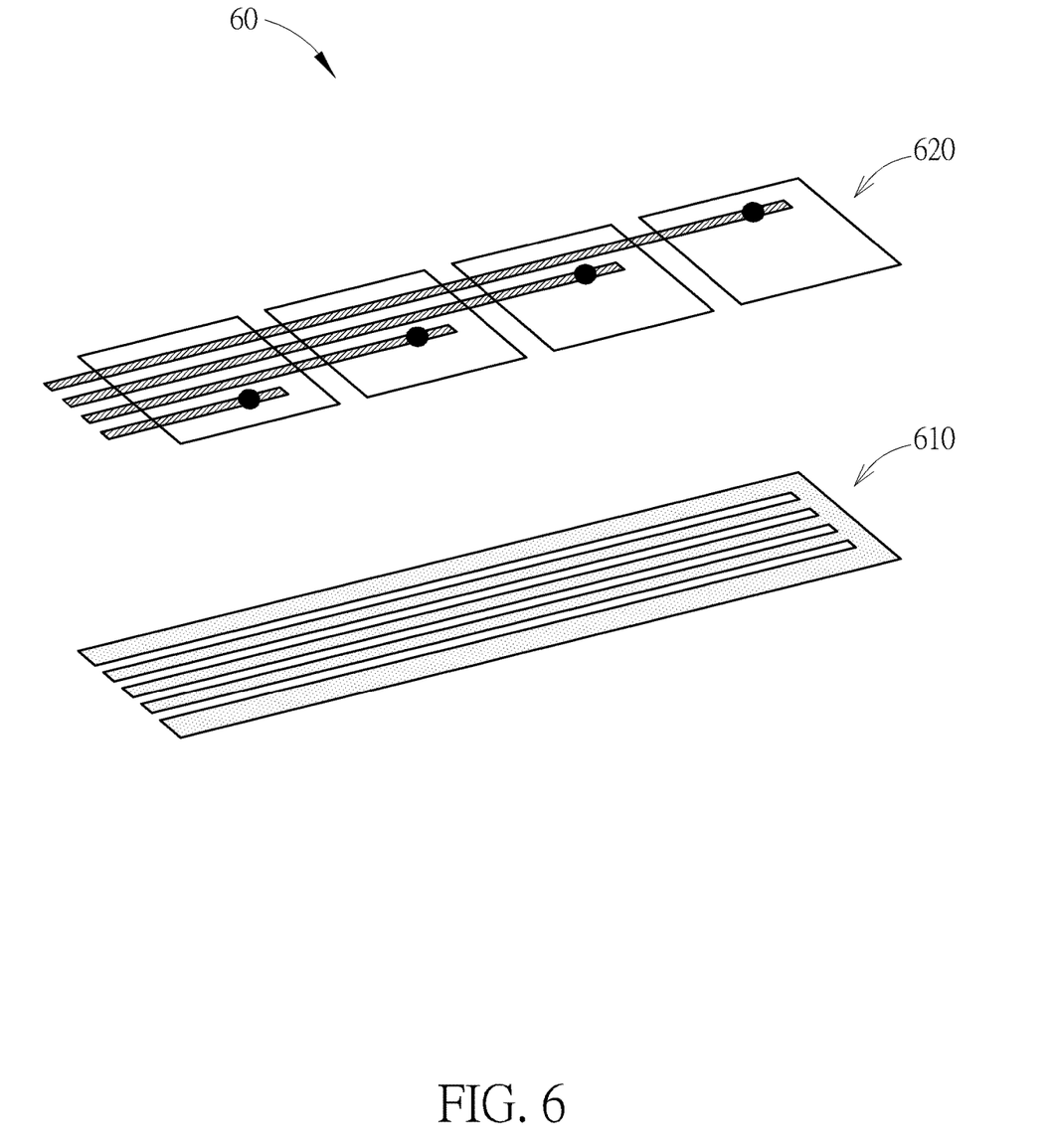
FIG. 6 is a schematic diagram of a display panel in which removal of the conductive material has a further pattern.

As mentioned above, the removed parts of the conductive material may be smaller than the overlapping parts since the conductive lines of the gaps may be realized by keeping the conductive material in specific points of the gaps during the removal process. In another embodiment, the removed parts of the conductive material may be greater than the overlapping parts. An exemplary deployment is shown in FIG. 6, where a display panel 60 having a common electrode layer 610 and a touch sensor layer 620 is illustrated. The difference between the common electrode layer 610 and the common electrode layer 410 is that, in the common electrode layer 610, each gap is extended to have the same length. This implementation may improve the uniformity and symmetry of the electric field throughout the entire panel.

As can be seen, the conductive material may be removed to have any possible pattern, which may be or may not be exactly identical to the overlapping areas with the conductive lines. As long as the conductive material is removed in an area overlapping the conductive lines of the touch sensor due to the coupling capacitance, the removal pattern will not be a limitation to the scope of the present invention.

It should also be noted that the removed parts of the conductive material in the common electrode layer may be automatically filled with a nonconductive material in the fabrication process of the display panel. For example, in the OLED panel 10, the common electrode layer 102 is a flat-plane electrode, and the encapsulation materials of the encapsulation layer 104 are coated on the conductive material of the common electrode layer 102. The pattern of the conductive material may be generated by etching. After the overlapping area in the conductive material is removed, the coating process for the encapsulation layer 104 may be performed. The encapsulation materials may include non-conductive materials such as organic materials and silicon oxide, and these materials are combined layer after layer to form the encapsulation layer 104. Since the common electrode layer 102 may have an extremely thin thickness, the encapsulation materials may easily fill into the gap(s) in the conductive material of the common electrode layer 102 in the coating process. In such a situation, removal of the conductive material in the common electrode layer 102 may be realized without additional materials and redundant steps in the fabrication process.

If the conductive material is included in the common electrode layer 302 of the LCD panel 30, removal of the conductive material may be realized in a similar manner. In a general LCD panel, there may be a common ITO layer (e.g., in the common electrode layer) and a pixel ITO layer (e.g., in the TFT layer), where an electric field is generated between these two ITO layers to twist the liquid crystal molecules. The common ITO and the pixel ITO and their related circuit elements and circuit lines (such as source lines and gate lines) are isolated by nonconductive materials such as an organic material and silicon oxide. The circuitry may be generated by etching, and the nonconductive material may fill into the gaps between the circuitry composed of the ITOs and related circuit elements and lines. Also, the pattern of the conductive material in the common electrode layer 302 may be generated by etching. If there is a gap within the conductive material, the nonconductive material may fill into the gap during the fabrication process. In such a situation, removal of the conductive material in the common electrode layer 302 may be realized without additional materials and redundant steps in the fabrication process.

Figure 7:
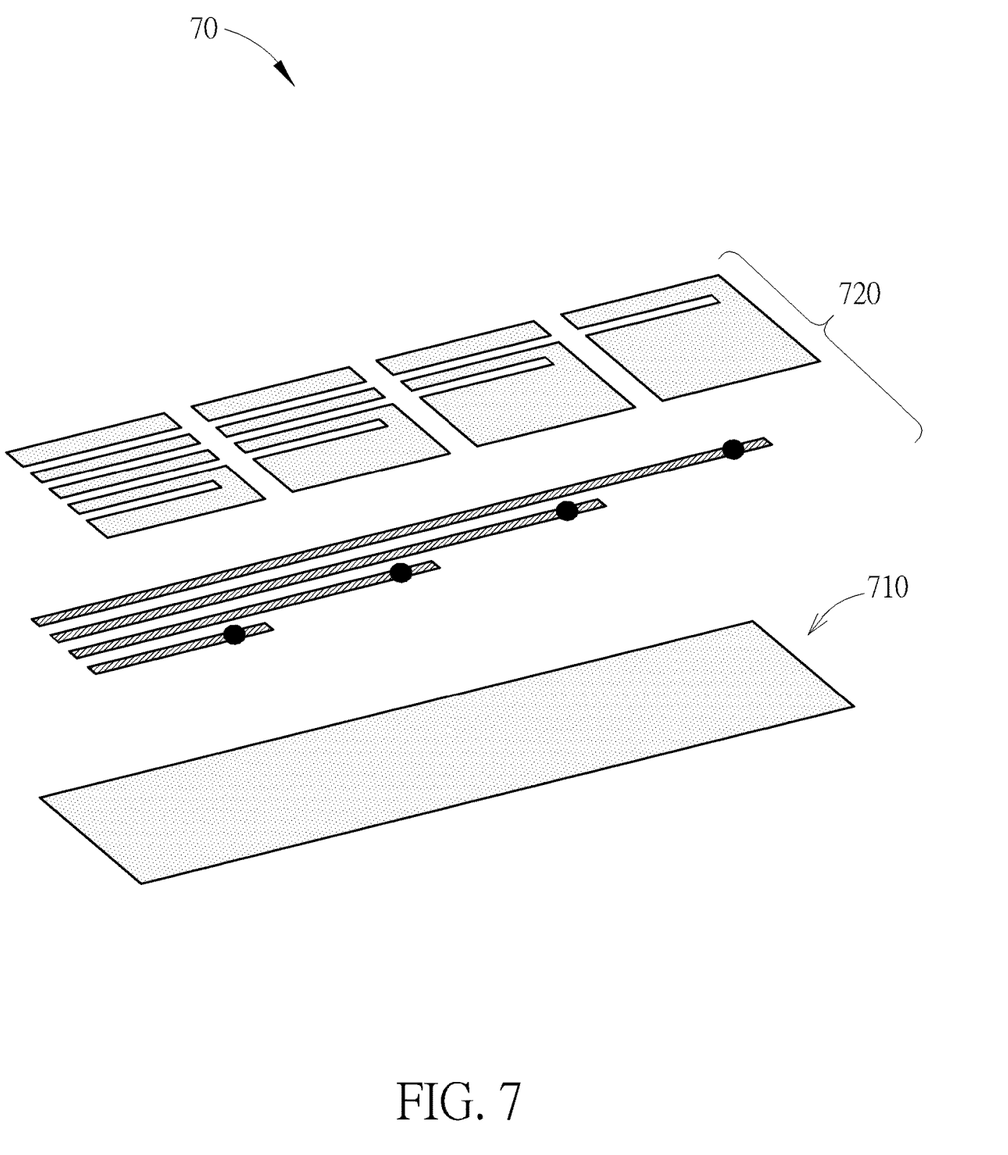
FIG. 7 is a schematic diagram of another display panel according to an embodiment of the present invention.

Please refer to FIG. 7, which is a schematic diagram of another display panel 70 according to an embodiment of the present invention. As shown in FIG. 7, the display panel 70 includes a common electrode layer 710 and a touch sensor layer 720, where the touch sensor layer 720 includes a layer of touch sensing electrodes and a layer of conductive lines. Similarly, the common electrode layer 710 may be the common electrode layer 102 included in the OLED panel 10 or the common electrode layer 302 included in the LCD panel 30. The touch sensor layer 720 may be the touch sensor layer 106 included in the OLED panel 10 or the touch sensor layer 306 included in the LCD panel 30. The touch sensing electrodes of the touch sensor layer 720 are composed of conductive material such as ITO. Other possible layers or elements, such as the substrate, encapsulation layer, TFT layer, and color filter, may be included or not based on the panel's type. These elements are omitted herein for brevity without influencing the illustrations of the present embodiment.

As shown in FIG. 7, in the conductive material of the touch sensing electrodes, the areas overlapping the conductive lines of the touch sensor layer 720 may be removed. Note that the parasitic capacitance may also be generated between the touch sensing electrodes and the conductive lines since these two layers are close in the touch sensor. Therefore, removal of the overlapping parts may significantly reduce the parasitic capacitance. These overlapping areas only occupy a small ratio of the entire touch sensing electrodes, and thus removal of these areas will not influence the touch sensing performance evidently. Note that FIG. 7 illustrates an implementation of the touch sensor layer 720 where the conductive lines are disposed below the touch sensing electrodes. In an alternative embodiment, the conductive lines may be disposed above the touch sensing electrodes.

Similarly, the removed part in the touch sensing electrodes may have any possible patterns. More specifically, the patterns of the conductive material in the common electrode layer illustrated in FIGS. 4-6 are all feasible in the touch sensing electrodes. The detailed implementations are illustrated in the above paragraphs, and will not be narrated herein.

Please note that the embodiments of the present invention aim at providing a touch panel where the parasitic capacitance may be reduced by removing an overlapping part in the conductive material. Those skilled in the art may make modifications and alternations accordingly. For example, in the above embodiment, the method of removing overlapping parts of the conductive material in the common electrode layer or the touch sensing electrodes is applied to the OLED panel or the LCD panel. In another embodiment, the proposed method may be applicable to any type of panel, which should not be limited to those described in the present disclosure. In additional, the parasitic capacitance may be reduced by removing parts of the conductive material in the common electrode layer overlapping the conductive lines or parts of the conductive material in the touch sensing electrodes overlapping the conductive lines. In an embodiment, both of the common electrode layer and the touch sensing electrodes may be designed to have a gap corresponding to the conductive lines; that is, the removal implementations of FIG. 4 and FIG. 7 may be combined to further reduce the parasitic capacitance. Further, removal of the overlapping parts may generate any possible pattern in the common electrode layer or the touch sensor layer, and the pattern may be of any shape. For example, the common electrode layer or the touch sensor layer may include a dummy material encompassed by the removed conductive material in the overlapping area.

Figure 8:
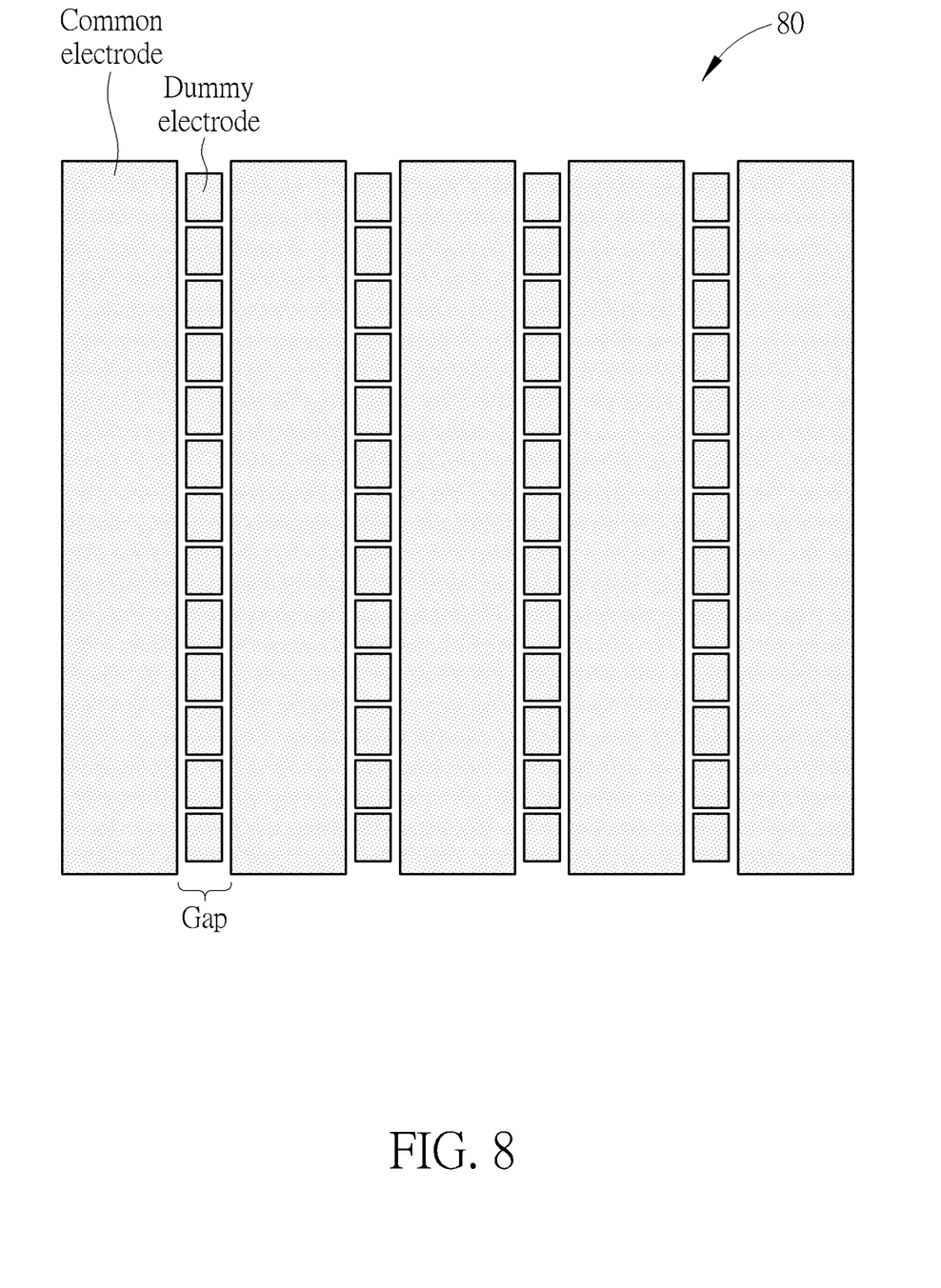
FIG. 8 is a schematic diagram of a common electrode layer according to an embodiment of the present invention.

Please refer to FIG. 8, which is a schematic diagram of a common electrode layer 80 according to an embodiment of the present invention. As shown in FIG. 8, the common electrode layer 80 may be the common electrode layer 102 included in the OLED panel 10 or the common electrode layer 302 included in the LCD panel 30. The conductive material of the common electrode layer 80 includes 4 gaps overlapping 4 conductive lines of the touch sensor, respectively. Considering the uniformity of the conductive material, each of the 4 gaps may further include several dummy materials. These dummy materials are not connected to the conductive materials in the common electrode layer 80 on which a voltage is applied, i.e., the dummy materials are floating without receiving the cathode voltage or common voltage.

More specifically, in the embodiments shown in FIGS. 4-6, each gap overlapping the conductive lines may be empty and filled with nonconductive materials after coating. In comparison, as shown in FIG. 8, there are dummy materials encompassed by the removed parts; that is, in the etching process, the conductive materials in the dummy areas are not removed but left in the common electrode layer 80 as the dummy materials. Since the dummy materials are floating, the floating conductive material may not generate additional parasitic capacitance. The dummy materials allow the common electrode layer 80 to be filled with more conductive materials, in order to achieve a higher uniformity of light penetration ratio, which leads to a higher visual performance.

The dummy areas may be disposed to have any possible pattern. As shown in FIG. 8, each gap includes multiple floating dummy materials not connected to each other and not connected to the common electrode where the common voltage is applied. In another embodiment, each gap may include a long dummy electrode overlapping the conductive lines of the touch sensor. In an embodiment, there may be a bridge line connected between two dummy electrodes, and/or a dummy electrode may be connected to the large area common electrode through a bridge line so that this dummy electrode may not be floating. This implementation may increase the signal integrity on the common electrode, but the parasitic capacitance may be higher.

Please note that the implementations of dummy areas may also be applicable to the embodiment where the conductive material of touch sensing electrodes in the areas overlapping the conductive lines is removed. In this embodiment, the detailed implementations and alternations of the dummy electrodes in the touch sensor are similar to those of the dummy electrodes in the common electrode layer, and thus may be easily understood by those skilled in the art based on the illustrations in the above paragraphs and related figures.

To sum up, the embodiments of the present invention provide a touch panel where the parasitic capacitance may be reduced by removing an overlapping part in the conductive material. The conductive material may be a large area flat-plane electrode in a common electrode layer of an OLED panel or an LCD panel, or in a touch sensor of a touch panel. The overlapping part may be an area of the conductive material overlapping parts of or all of the conductive lines in the touch sensor. The parasitic capacitance may be inversely proportional to the distance between two conductive objects. Therefore, removal of the conductive material in the overlapping area may significantly reduce the parasitic capacitance, so as to improve the display and touch performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
   a common electrode layer, having a conductive material; and
   a touch sensor, disposed over the common electrode layer, the touch sensor comprising:
     a plurality of touch sensing electrodes; and
     a plurality of conductive lines, each coupled to at least one of the plurality of touch sensing electrodes;
   wherein the conductive material in an area of the common electrode layer overlapping a part of the plurality of conductive lines is removed.

2. The display panel of claim 1, wherein the display panel is an organic light-emitting diode (OLED) panel, and the common electrode layer comprises a cathode electrode of an OLED in the OLED panel.

3. The display panel of claim 1, wherein the display panel is a liquid crystal display (LCD) panel, and the common electrode layer comprises a common voltage electrode of a display pixel in the LCD panel.

4. The display panel of claim 1, wherein the part of the plurality of conductive lines comprises all of the plurality of conductive lines.

5. The display panel of claim 1, wherein the common electrode layer comprises a plurality of dummy materials overlapping the part of the plurality of conductive lines, and the dummy materials are floating.

6. A display panel, comprising:
   a common electrode layer; and a touch sensor, disposed over the common electrode layer, the touch sensor comprising:
- a plurality of touch sensing electrodes composed of a conductive material; and
- a plurality of conductive lines, each coupled to at least one of the plurality of touch sensing electrodes;

wherein the conductive material in an area of the plurality of touch sensing electrodes overlapping a part of the plurality of conductive lines is removed.

7. The display panel of claim 6, wherein the display panel is an organic light-emitting diode (OLED) panel, and the common electrode layer comprises a cathode electrode of an OLED in the OLED panel.

8. The display panel of claim 6, wherein the display panel is a liquid crystal display (LCD) panel, and the common electrode layer comprises a common voltage electrode of a display pixel in the LCD panel.

9. The display panel of claim 6, wherein the part of the plurality of conductive lines comprises all of the plurality of conductive lines.

10. The display panel of claim 6, wherein the touch sensing electrodes comprise a plurality of dummy materials overlapping the part of the plurality of conductive lines, and the dummy materials are floating.

\* \* \* \* \*